No. 733,474. PATENTED JULY 14, 1903.
M. FLANNERY.
DEFLECTOR FOR OVENS.
APPLICATION FILED DEC. 2, 1902.
NO MODEL.
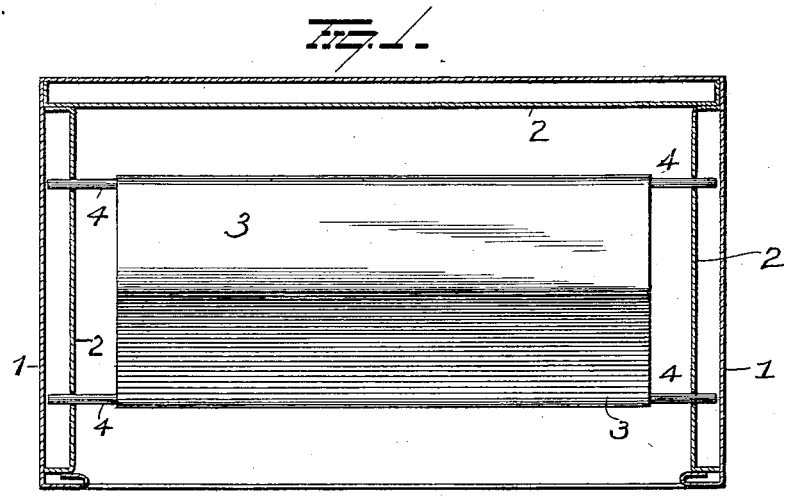
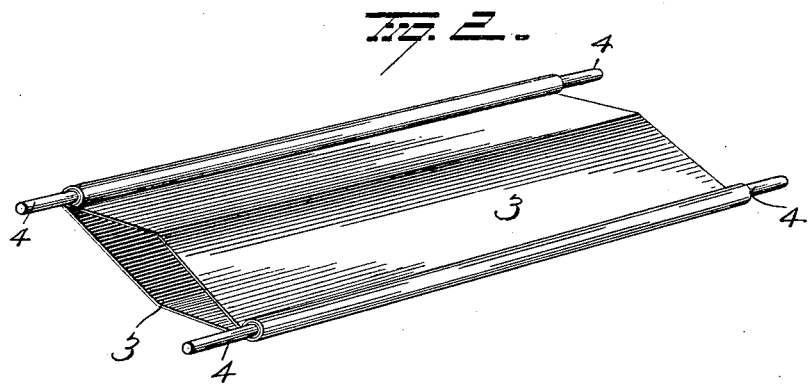
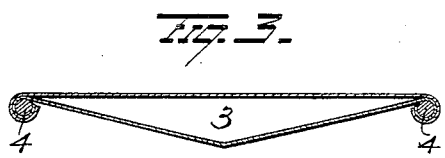 
WITNESSES
E. Nottingham
G. F. Downing
INVENTOR
M. Flannery
By H. A. Seymour
Attorney No. 733,474. Patented July 14, 1903.

UNITED STATES PATENT OFFICE.

MICHAEL FLANNERY, OF NEWPORT, KENTUCKY, ASSIGNOR TO ERNST H. HUENEFELD, OF CINCINNATI, OHIO.

DEFLECTOR FOR OVENS.

SPECIFICATION forming part of Letters Patent No. 733,474, dated July 14, 1903.

Application filed December 2, 1902. Serial No. 133,576. (No model.)

*To all whom it may concern:*

Be it known that I, MICHAEL FLANNERY, of Newport, in the county of Campbell and State of Kentucky, have invented certain new and useful Improvements in Deflectors for Ovens; and I do hereby declare the following to be a full, clear, and exact description of the invention, such as will enable others skilled in the art to which it appertains to make and use the same.

My invention relates to an improved deflector for ovens, the object of the invention being to provide an improved deflector which will be rigidly supported by the lining of the oven, yet which can be readily removed and reversed when desired.

With this object in view the invention consists in certain novel features of construction and combinations and arrangements of parts, as will be more fully hereinafter described, and pointed out in the claims.

In the accompanying drawing, Figure 1 is a view illustrating my improvements in an oven. Fig. 2 is a view of the deflector removed, and Figs. 3 and 4 are views illustrating modifications.

1 represents an oven-body having a removable lining 2 in its ends, and 3 represents my improved deflector, which comprises two metal sheets bent longitudinally at their centers, forming a top and bottom of the same shape and converging to their edges, where the sheets are bent around straight rods or wires 4. These rods or wires 4 are adapted to be projected through openings in lining 2 and securely hold the deflector in proper position, and it will be seen that as the deflector is made precisely alike on its top and bottom it can be reversed, if desired. By removing the lining 2 the deflector can also be removed, yet when the lining is in place in the oven the deflector will be rigidly held thereby.

Instead of making the deflector as above described I might construct the same with a flat top, as shown in Fig. 3, or I might dispense altogether with a top, as shown in Fig. 4, the essential feature of my invention being the rods projecting into the lining and supporting the deflector of any shape or form, but preferably as shown in the preferred form of my invention.

A great many changes might be made in the general form and arrangement of the parts described without departing from my invention, and hence I do not confine myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with an oven and a removable lining therein, said lining having holes, of a deflector, rods secured to the longitudinal edges of the deflector, said rods projecting beyond the ends of the deflector and entering the holes in the removable lining of the oven.

2. A deflector, comprising parallel rods, metal plates bowed apart at their central portion and having their edges bent around the rods.

3. A deflector for ovens, comprising parallel rods to be projected into the lining of the oven, metal plates bent longitudinally at their centers at an angle in opposite directions and having their longitudinal edges bent around the rods.

In testimony whereof I have signed this specification in the presence of two subscribing witnesses.

MICHAEL FLANNERY.

Witnesses:
GEO. W. CORMANY,
CHARLES E. PFAU.